US006896603B1

(12) United States Patent
Lessway

(10) Patent No.: US 6,896,603 B1
(45) Date of Patent: May 24, 2005

(54) STEADY REST WITH INDEPENDENT VERTICAL AND HORIZONTAL ADJUSTMENTS

(75) Inventor: Richard J. Lessway, Farmington Hills, MI (US)

(73) Assignee: Arbotech Systems, Inc., Madison Heights, MI (US)

( * ) Notice: Subject to any disclaimer, the term of this patent is extended or adjusted under 35 U.S.C. 154(b) by 0 days.

(21) Appl. No.: 10/725,737

(22) Filed: Dec. 2, 2003

Related U.S. Application Data

(63) Continuation-in-part of application No. 09/975,692, filed on Oct. 12, 2001, now Pat. No. 6,699,113.

(51) Int. Cl.[7] .............................................. B24B 41/06
(52) U.S. Cl. ....................................... 451/408; 451/406
(58) Field of Search .................................. 451/408, 406, 451/407, 242, 244, 49; 82/157, 164, 162

(56) References Cited

U.S. PATENT DOCUMENTS

| 4,399,639 | A |   | 8/1983  | Lessway           |
|-----------|---|---|---------|-------------------|
| 4,519,279 | A | * | 5/1985  | Ruggeri .... 82/162 |
| 4,647,097 | A |   | 3/1987  | Lessway           |
| 4,647,100 | A |   | 3/1987  | Lessway           |
| 4,650,237 | A | * | 3/1987  | Lessway ... 294/119.1 |
| 5,058,468 | A |   | 10/1991 | Lessway           |
| 5,237,780 | A |   | 8/1993  | Lessway           |
| 5,285,599 | A |   | 2/1994  | Lessway           |

* cited by examiner

Primary Examiner—Robert A. Rose
(74) Attorney, Agent, or Firm—Charles W. Chandler

(57) ABSTRACT

A steady rest having separate adjusting screws for adjusting the clamping positions of three workpiece engaging rollers either horizontally or vertically.

8 Claims, 7 Drawing Sheets

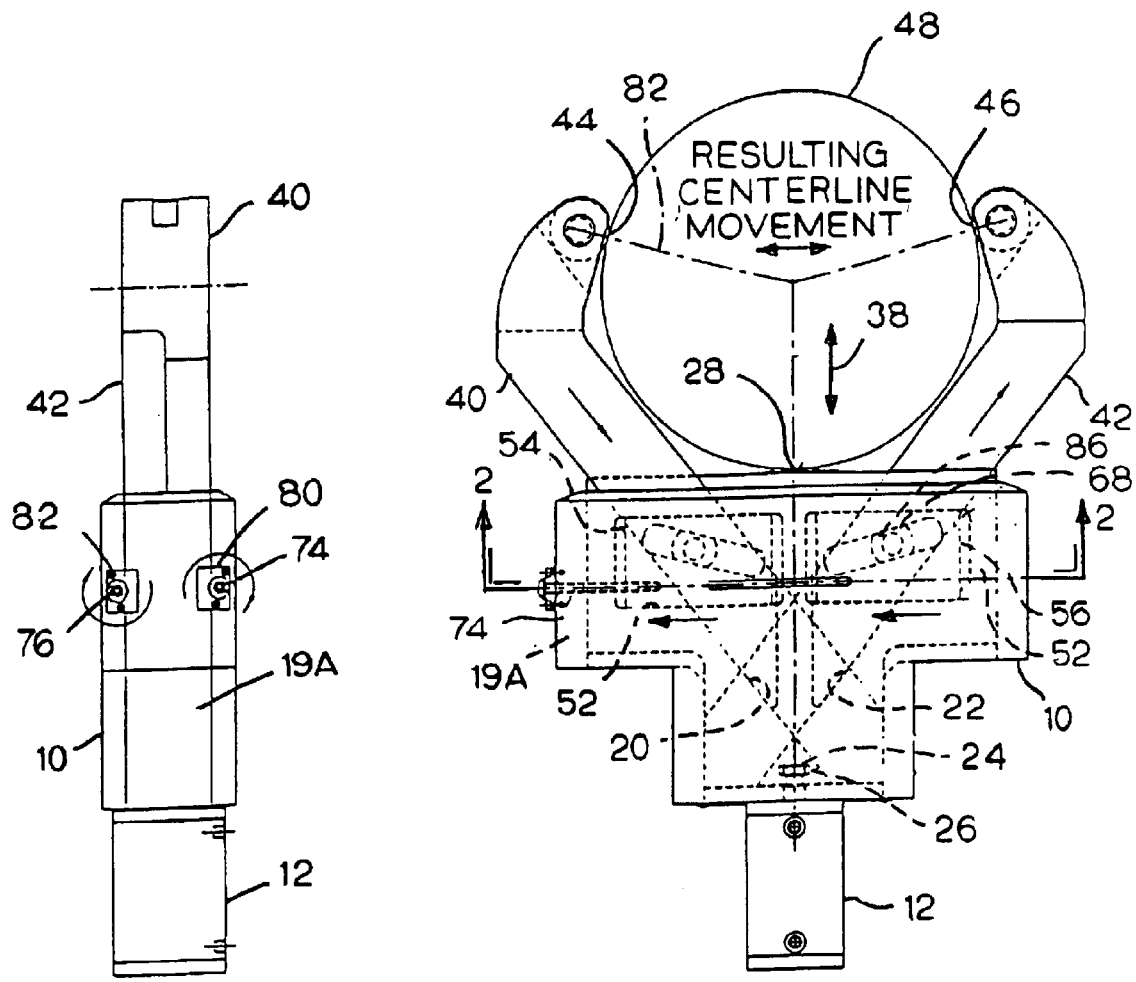
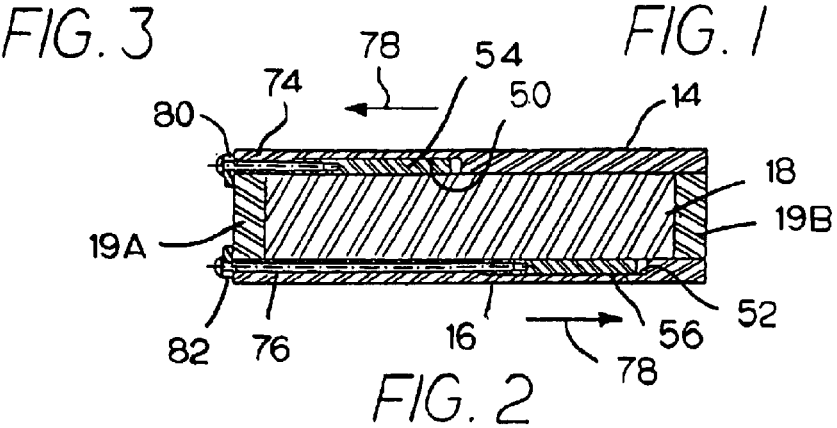
FIG. 3
FIG. 1
FIG. 2

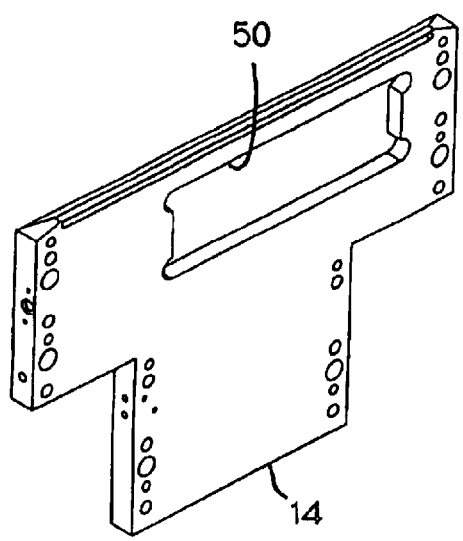
FIG. 16
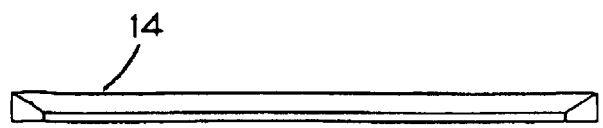
FIG. 18
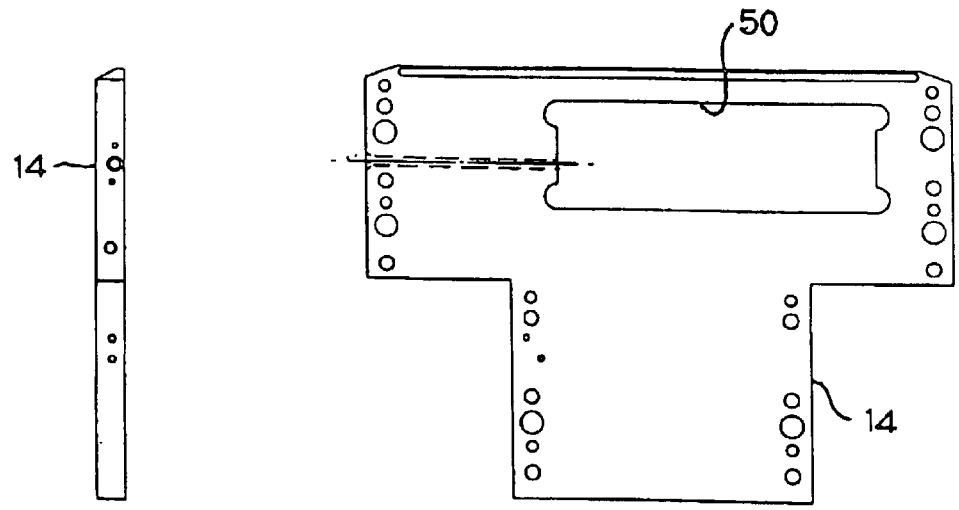
FIG. 19                          FIG. 17

STEADY REST WITH INDEPENDENT VERTICAL AND HORIZONTAL ADJUSTMENTS

CROSS-REFERENCE TO RELATED APPLICATION

This application is a continuation-in-part of my patent application Ser. No. 09/975,692, filed Oct. 12, 2001 now U.S. Pat. No. 6,699,113, for "Steady Rest with Vertical Adjustment".

BACKGROUND AND SUMMARY OF THE INVENTION

This invention relates to steady rests employed to support a cylindrical workpiece for precision machining or grinding. More specifically, this invention relates to a multi-point, true centering steady rest having internal cams for adjusting the center position of a supported rotating workpiece, both horizontally and vertically.

Steady rests are commonly used to support rotating cylindrical workpieces for machining or grinding. Steady rests may be found in several of my prior United States Patents, including: U.S. Pat. No. 5,285,599 issued Feb. 15, 1994, for "Method for Adjusting a Steady Rest Having an Internal Centerline Adjustment"; U.S. Pat. No. 5,237,780 issued Aug. 24, 1993 for "Steady Rest with Internal Centerline Adjustment"; U.S. Pat. No. 5,058,468 issued Oct. 22, 1991 for "Remote Gage Steady Rest Heads"; U.S. Pat. No. 4,647,100 issued Mar. 3, 1987 for "Parallel Gripper with Roller Supported Gripper Arms"; U.S. Pat. No. 4,647,097 issued Mar. 3, 1987 for "I.D. or O.D. Parallel Gripper"; and U.S. Pat. No. 4,399,639 issued Aug. 23, 1983 for "True Centering Steady Rest".

Typically, a steady rest includes a housing mounted on a suitable base adjacent the workpiece. A body in the housing is slidably movable toward or away from the horizontal axis (centerline) of the workpiece, by a hydraulic cylinder or other means of actuation. Gripping (clamping) arms are slidably mounted in a crisscross pattern on the body and move with the body. A wear pad or roller is attached to the outer ends of each of the two arms, and a third wear pad is attached to the body. An internal adjustment means permits the three wear pads to cooperate in providing a three-point gripping arrangement for a rotating workpiece.

For a variety of reasons explained in my prior patents, the axis of a rotating workpiece may shift a small distance either horizontally or vertically. My prior patents disclose means for adjusting the wear pad locations for a horizontal change in the workpiece axis, without adjusting the steady rest housing.

A need exists for independently making either a vertical adjustment or a horizontal adjustment of the wear pads without having to adjust the position of the entire steady rest.

The broad purpose of the present invention is to provide an internal camming device for independently adjusting either the vertical or the horizontal position of the wear pads or rollers. The preferred embodiment employs two internal camming devices each connected to an adjusting screw. By rotating both adjustment screws in the same direction, the camming rails force one clamping arm in one direction and the other clamping arm in the other direction thereby resulting in a vertical adjustment of the imaginary clamping center of the clamping arms. Turning the adjusting screws in opposite directions moves the guide rails such that one clamping arm moves horizontally in one direction, and the other clamping arm moves horizontally in the other direction thereby resulting in a horizontal change in the clamping center of the clamping arms.

Still further objects and advantages of the invention will become readily apparent to those skilled in the art to which the invention pertains upon reference to the following detailed description.

DESCRIPTION OF THE DRAWINGS

The description refers to the accompanying drawings in which like reference characters refer to like parts throughout the several views and in which:

FIG. 1 is a view of a steady rest illustrating the preferred embodiment of the invention;

FIG. 2 is an enlarged sectional view as seen along lines 2—2 of FIG. 1;

FIG. 3 is a view as seen from the left-side of FIG. 1;

FIG. 16 is a perspective view of a preferred slide plate;

FIG. 17 is an elevational view of the slide plate of FIG. 16;

FIG. 18 is a top view of the slide plate of FIG. 16;

FIG. 19 is a view as seen from the left side of FIG. 16; and

DESCRIPTION OF THE PREFERRED EMBODIMENT

Figure 4:
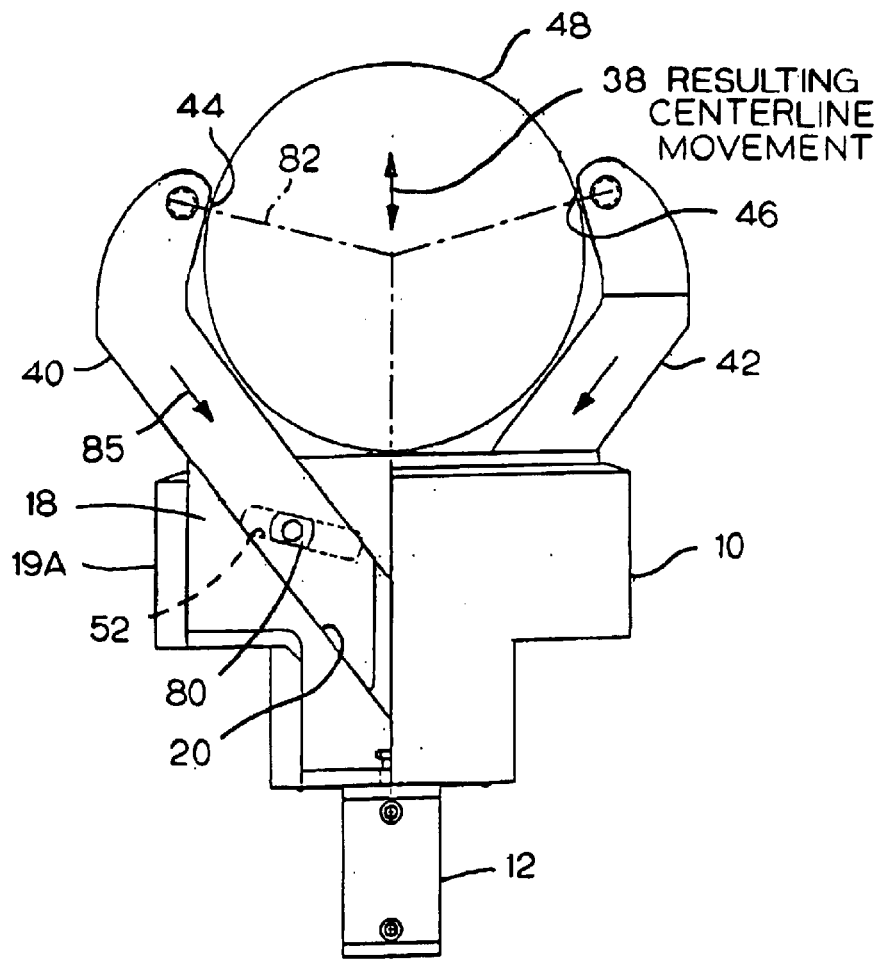
FIG. 4 is a view similar to FIG. 1 but in which the left half of the side cover plate has been removed to show the movement of a clamping arm.

Referring to the drawings, a preferred steady rest 10 is illustrated in FIG. 1 and includes a hydraulic piston and cylinder actuator 12. The steady rest also includes, for descriptive purposes, a rear cover plate 14, a front cover plate 16, parallel to plate 14, and a guide body 18 sandwiched between the two cover plates. The two cover plates and the guide body each have a T-shaped configuration.

A pair of side plates 19A and 19B are fastened by threaded fasteners, not shown, or by other suitable means to the outer edges of the front and rear cover plates forming a housing so that the guide body can slide in the direction of arrow 38 as viewed in FIG. 4.

Figure 6:
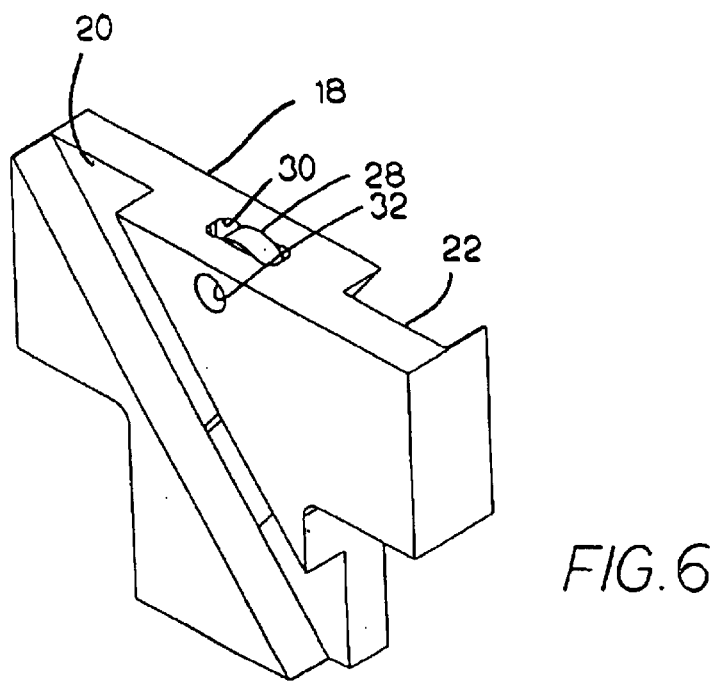
FIG. 6 is a perspective view of a preferred camming body.
Figure 7:
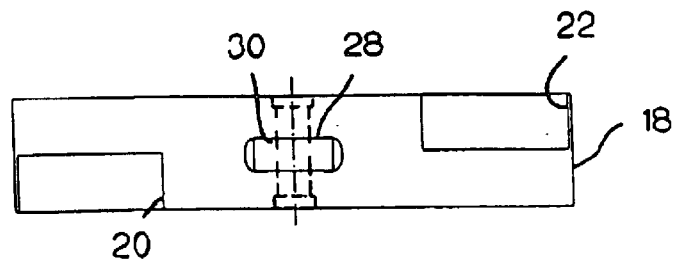
FIG. 7 is a top view of the camming body of FIG. 6.
Figure 8:
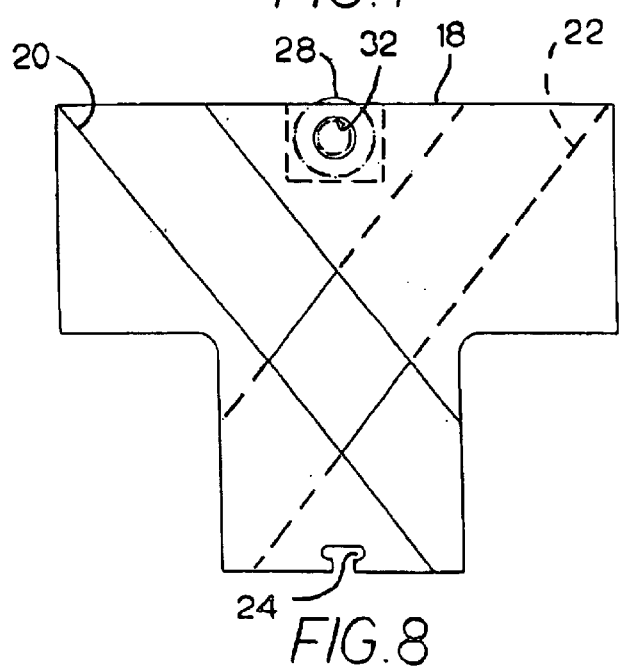
FIG. 8 is a view as seen from the bottom of FIG. 7.
Figure 9:
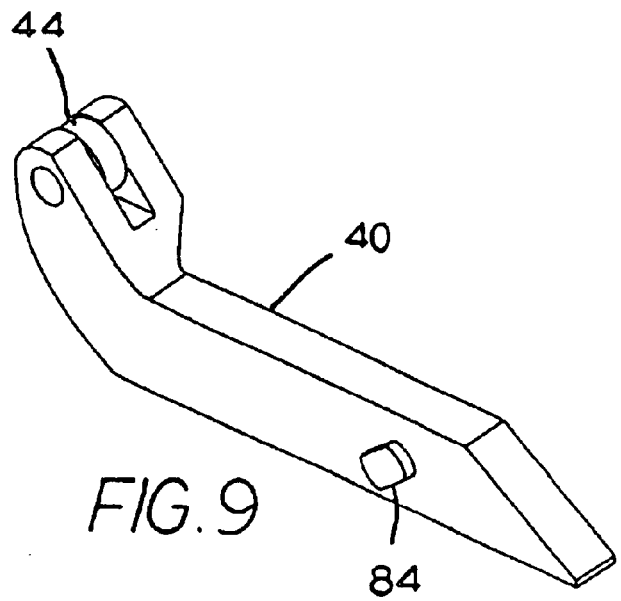
FIG. 9 is a perspective view of a preferred clamping arm.
Figure 10:
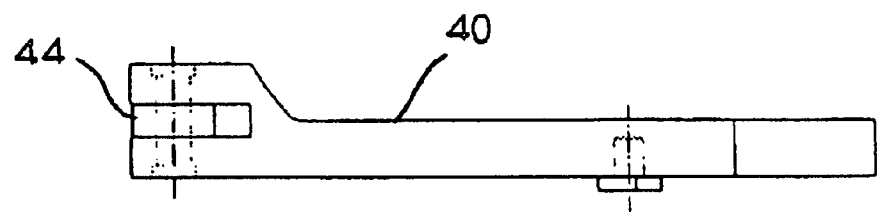
FIG. 10 is a plan view of the clamping arm of FIG. 9.

Referring to FIGS. 6–8, guide body 18 has a front slot 20, and a rear slot 22. The two slots are formed at an angle suited for the work. Each of the guide slots has a channel-shaped configuration. The bottom of the guide body has a slot 24 for receiving a device 26 for connecting the piston rod to the guide body as best shown in FIG. 1.

Referring to FIGS. 6–8, a workpiece-engaging roller 28 is mounted in a recess 30 at the wide end (forward end) of the guide body. Roller 28 is rotatably mounted on a shaft 32 supported in a recess 33 in the guide body. Roller 28 extends slightly beyond a planar surface facing the workpiece, as illustrated in FIG. 8.

Referring to FIGS. 1, 4, and 9–12 clamping arms 40 and 42 are slidably mounted in slots 20 and 22, respectively. Front clamping arm 40 carries a workpiece-engaging roller 44, while rear clamping arm 42 carries a workpiece engaging roller 46. The three workpiece-engaging rollers 28, 44 and 46 cooperate in supporting a cylindrical workpiece 48 for a grinding operation. The workpiece may weigh as much as 4,000 pounds or more.

Figure 20:
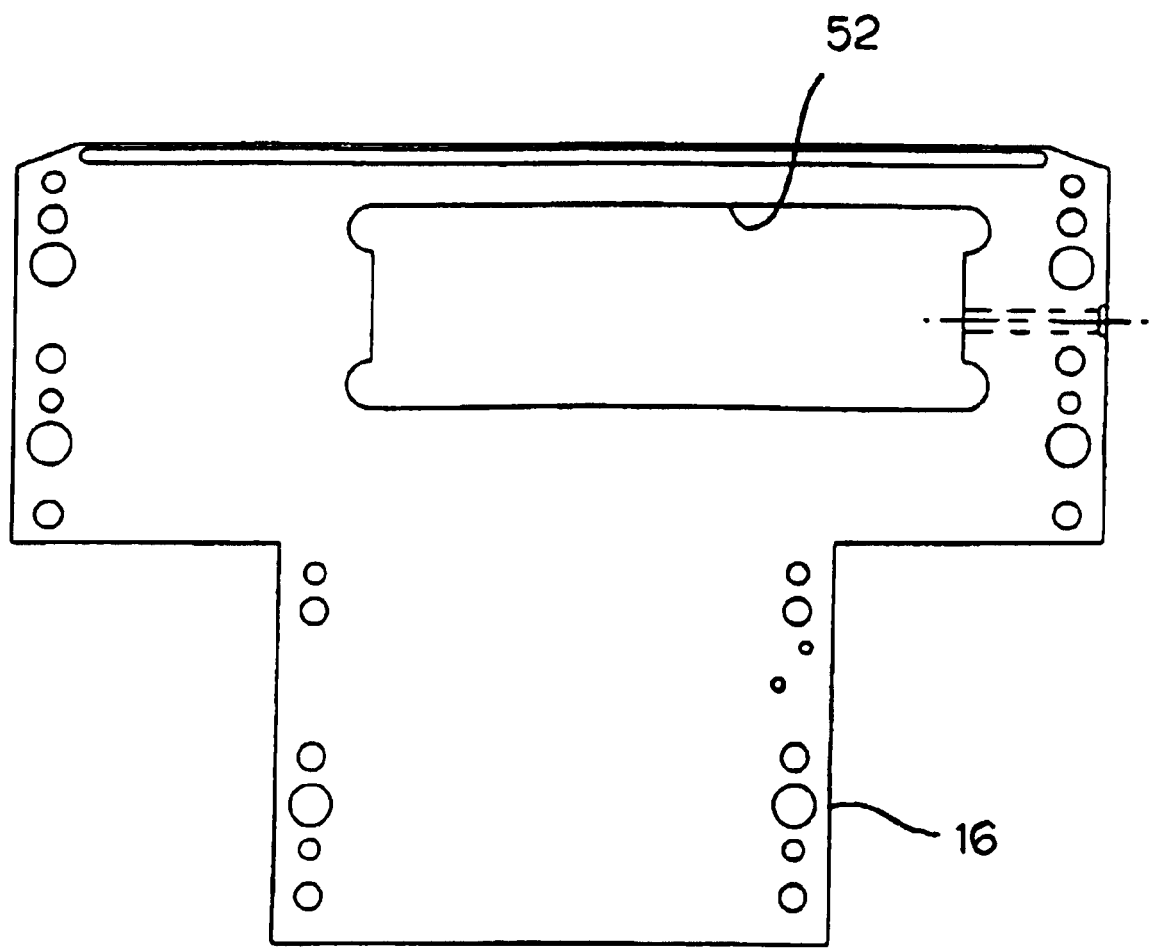
FIG. 20 is an elevational view of the other slide plate.

Front cover plate 14 is shown in FIGS. 16–19. Rear cover plate 16 is shown in FIG. 20. Front cover plate 14 has an elongated generally rectangular pocket forming a cam opening 50, and rear cover plate 16 has an elongated generally rectangular pocket forming a cam opening 52. Cam opening 52 is disposed adjacent slot 22. Cam opening 50 is disposed adjacent slot 20.

Figure 5:
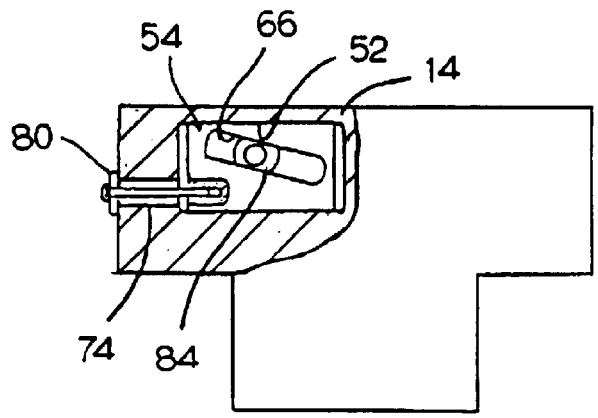
FIG. 5 is an enlarged sectional view of a side plate, separated from FIG. 4.

Referring to FIGS. 2 and 5, guide plate 54 is slidably mounted in cam opening 52. A second guide plate 56 is slidably mounted in cam opening 50. The two guide plates are identical and movable transversely with respect to the direction of movement 38 of guid body 18.

Figure 13:
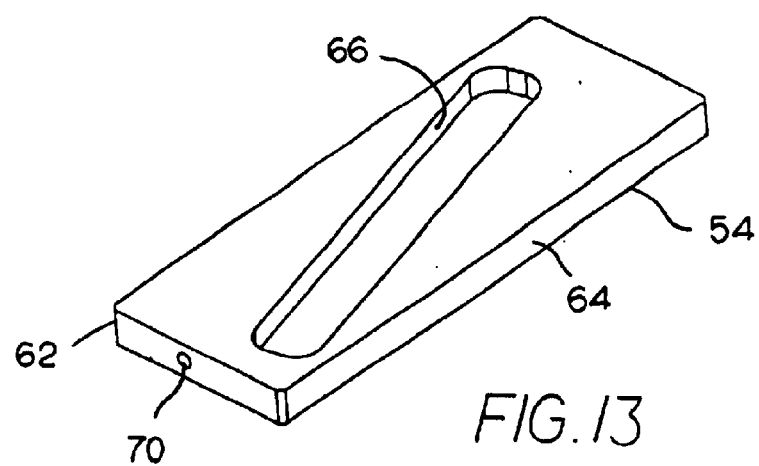
FIG. 13 is a perspective view of a guide rail.
Figure 15:
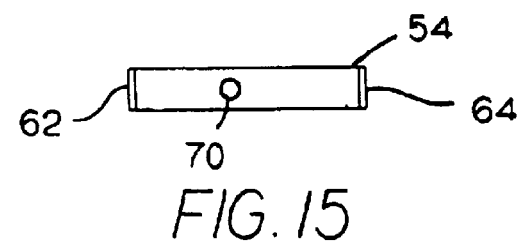
FIG. 15 is a view as seen from the topside of FIG. 14.
Figure 14:
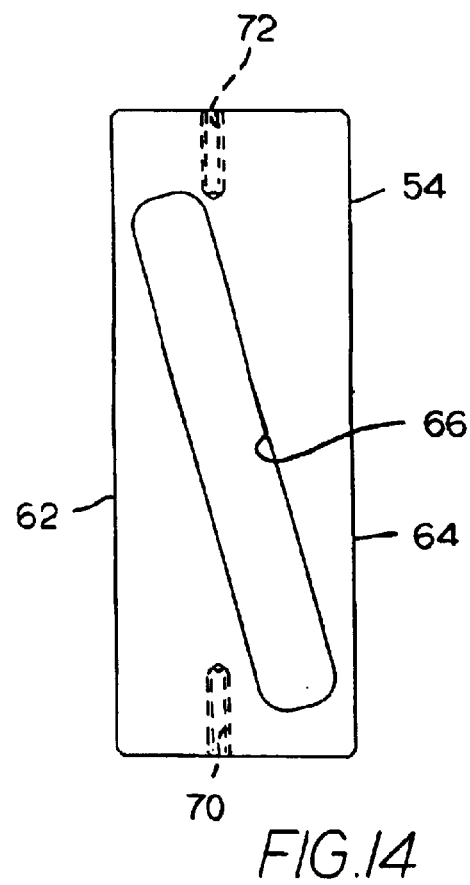
FIG. 14 is a plan view of the guide rail of FIG. 13.

Guide plate 54 is illustrated in FIGS. 13–15. Guide plate 54 has a pair of sides 62 and 64 which are slidably engaged with the long sides of cam opening 52. Guide plate 54 has an inclined camming slot 66 formed at an angle with respect to sides 62 and 64, that is suited for the work. Guide plate 56 and guide plate 54 are mounted in their respective cam openings on opposite sides of slots 20 and 22 so that their corresponding camming slots 66 and 68 are inclined in opposite directions, as shown in FIG. 1.

Referring to FIGS. 13–15, each guide plate has a pair of tapped openings 70 and 72. As best shown in FIGS. 1–3, tapped opening 70 of guide plate 54 is threadably connected to a short adjusting screw 74 which extends from the left side of guide plate 54. Guide plate 56 is threadably connected by tapped opening 72 to a longer adjusting screw 76. The two adjusting screws are parallel to one another, and more their respective guide plate in the direction of arrows 78, transverse to the direction 38 of guide body 18. Adjusting screw 74 has a head mounted on cover plate 16 and adjusting bracket 80, as best shown in FIG. 3. Adjusting screw 76 has a head mounted on cover plate 14 and adjusting bracket 82.

Figures 11, 12:
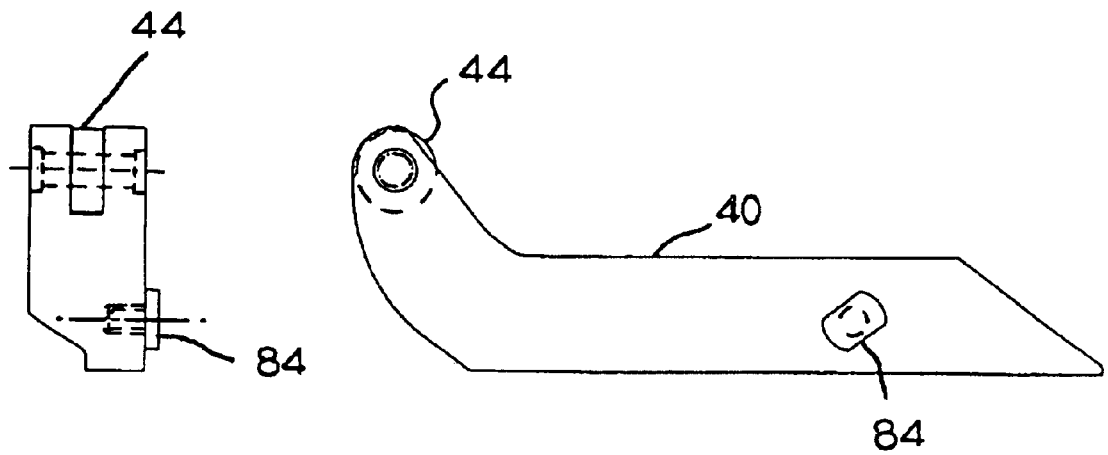
FIG. 11 is a view as seen from the bottom of FIG. 10.
FIG. 12 is a view as seen from the left-side of FIG. 11.

Front clamping arm 42, as shown in FIGS. 5 and 11, has a cam 84 that slidably fits in camming slot 66 in such a manner that when hydraulic actuator 12 advances the guide body in the direction of arrow 38 to clamp the workpiece, clamping arm 40 slides along slot 20, parallel to the axis of movement 83 of roller 44, as viewed in FIG. 4. When actuator 12 moves the guide body upwardly, as viewed in FIG. 2, clamping arm 40 moves upwardly with the guide body, and laterally as guide plate 54 slides along cam opening 52, and cam 84 slides along camming opening 66. If the actuator moves the guide body in the opposite direction, the clamping arm will move in the opposite direction.

Referring to FIGS. 1 and 3, rotating short adjusting screw 74 in one direction, for lateral movement, will horizontally adjust the location of guide plate 54 in one direction. Rotating adjusting screw 74 in the opposite direction will move guide plate 54 in the opposite horizontal direction.

Similarly, referring to FIG. 1, rear clamping arm 42 has a cam 86, similar to cam 80, except that it extends toward rear cover plate 16 into cam opening 68 in guide plate 56. When the guide body is moved by actuator 12, upwardly as viewed in FIG. 1, clamping arm 42 will move toward the workpiece. When the actuator is moved in the opposite direction, clamping arm 42 will move in the opposite direction toward a release position.

Consequently, turning the adjusting screws in the same direction, to move both guide plates to the right as shown in FIG. 3, clamping arm 42 will move to the left and up, clamping arm 40 will move to the right and down, as viewed in FIG. 1, to adjust the vertical height of the workpiece. Rotating both adjusting screws in opposite directions will cause the two clamping arms to move toward either open or closed positions. The path of movement of the two arms can then be independently adjusted.

In summary, the adjusting screws are used to independently adjust the clamping position of the two clamping arms, and therefore the position of the workpiece center. The two adjusting screws permit the clamping arms to be adjusted so the center of the clamping positions of the three clamping rollers is concentric with the centerline of the workpiece. This adjustment is useful to accommodate a change in the center of the workpiece. Actuator 12 applies a constant pressure on the clamping arm so that the three rollers continue to advance as the workpiece is ground. Either a horizontal or a vertical adjustment of the clamping arms can be easily accommodated for a very heavy workpiece.

Having described my invention, I claim:

1. A steady rest with independent vertical and horizontal adjustments, comprising:

a base;

an actuating member movable along a first axis toward a work piece position that is moveable either vertically or horizontally;

a body slidably mounted on the base and having a first guide slot disposed at a first angle with respect to said first axis, and a second guide slot disposed at a second angle with respect to said first axis, and means connecting the body to the actuating member for movement along said first axis;

a first arm slidably movable in the first guide slot along a linear path of motion between a clamping position, and a release position along a second path of motion between a clamping position and a release position;

a second arm slidably movable in the second guide slot;

a first workpiece gripping member pivotally mounted on the first arm;

a second workpiece gripping member pivotally mounted on the second arm;

a third workpiece gripping member mounted on the body, so as to be moveable therewith;

a first gripping pad pivotally mounted on the first arm;

a second gripping pad spaced from the first gripping pad pivotally mounted on the second arm;

a third gripping pad mounted on the body;

the actuating member being connected to the first arm for movement in a first stroke, and the second arm for movement in a second stroke along their respective paths of motion;

cam means deposed between the actuating member and the first arm and the second arm for moving the first arm and the second arm toward their respective clamping position on the actuating member is moved in a first direction, and for moving the first arm and the second arm toward their respective release positions as the cam member is movable in a reverse direction, whereby a rotating workpiece may be gripped between the first, the second and the third new pads in which the axis of rotation of the workpiece is in a first workpiece position;

the body having a first camming opening, and a second camming opening spaced from the first camming opening;

a first camming plate slidably mounted in the first camming opening for movement in a direction normal to said first axis, as the actuating member moves the body along said first axis;

a second camming plate slidably mounted in the second camming slot for movement in a direction normal to said first axis, as the actuating member moves the body along said first axis;

the first camming plate having a third camming opening;

the second camming plate having a fourth camming opening;

a first camming structure carried on the first arm and received in the third camming slot so as to be movable in a first camming motion as the actuating member is moving the body along said first axis;

first adjusting structure mounted on the body and connected to the first camming plate to adjust the path of motion of the first arm either horizontally or vertically;

a second camming structure carried on the second arm and received in the fourth camming slot so as to be movable in a second path of motion as the actuating member is moving the body along said first axis; and second adjusting structure mounted on the body and connected to the second camming plate to adjust the path of motion either horizontally or vertically.

2. A steady rest as defined in claim 1, and in which the actuating member applies a constant bias on the first arm in their respective clamping positions.

3. A steady rest as defined in claim 1 in which the first and second adjusting structures are threaded members threadably mounted on the body.

4. A steady rest as defined in claim 1, and in which the actuating member is hydraulically actuated.

5. In a workpiece gripping apparatus, a combination comprising:

a base;

a body slidably mounted on the base;

a first clamping arm slidably mounted on the base along a first linear path of motion between a clamping position, and a release position;

a second clamping arm slidably mounted on the base adjacent the first clamping arm along a second linear path of motion parallel to the first path of motion of the first clamping arm, between a clamping position, and a release position;

the first clamping bar having a camming slot disposed at an acute angle with respect to the linear path of motion of the first clamping bar;

the second clamping bar having a camming slot disposed at an acute angle with respect to the linear path of motion of the second clamping bar;

actuator means and means supporting the actuator means for movement along an axis and either toward a workpiece position or away from the workpiece position;

a camming means disposed in the body and connected between the actuator member and the first arm and the second arm for moving them along their respective linear paths of motion toward their respective clamping positions as the camming means is moved in an actuating motion, and for moving the clamping bars toward their respective release positions as the camming means is moved in reverse motion; and a first workpiece gripping member pivotally mounted on the first clamping arm, and a second workpiece gripping member on the second clamping arm for engaging a rotatable workpiece as the clamping arms are urged toward their respective clamping positions.

6. A steady rest apparatus as defined in claim 1, in which the workpiece gripping members each comprise a wear pad.

7. A steady rest as defined in claim 1, in which the first workpiece gripping member is spaced from the second workpiece gripping member, and the first and second workpiece gripping members are disposed on opposite sides of the axis of rotation of the workpiece.

8. A steady rest as defined in claim 1, including a piston and cylinder actuator for moving the third clamping member toward or away from the workpiece.

* * * * *